(12) United States Patent
Hou et al.

(10) Patent No.: US 11,290,758 B2
(45) Date of Patent: Mar. 29, 2022

(54) METHOD AND APPARATUS OF POINT-CLOUD STREAMING

(71) Applicant: Samsung Electronics Co., Ltd., Suwon-si (KR)

(72) Inventors: Xueshi Hou, La Jolla, CA (US); Chenghao Liu, Frisco, TX (US); Imed Bouazizi, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/113,855

(22) Filed: Aug. 27, 2018

(65) Prior Publication Data

US 2019/0069000 A1 Feb. 28, 2019

Related U.S. Application Data

(60) Provisional application No. 62/552,094, filed on Aug. 30, 2017.

(51) Int. Cl.
*H04N 21/2385* (2011.01)
*H04N 21/6587* (2011.01)
(Continued)

(52) U.S. Cl.
CPC ........... *H04N 21/2385* (2013.01); *G06T 7/70* (2017.01); *G06T 15/20* (2013.01); *H04N 21/21805* (2013.01); *H04N 21/234345* (2013.01); *H04N 21/234354* (2013.01); *H04N 21/2402* (2013.01); *H04N 21/6587* (2013.01);
(Continued)

(58) Field of Classification Search
None
See application file for complete search history.

(56) References Cited

U.S. PATENT DOCUMENTS 6,118,456 A * 9/2000 Cooper .................. G06T 15/40
345/619
9,773,343 B2 9/2017 Zhang et al.
(Continued)

FOREIGN PATENT DOCUMENTS

CN 105939482 A 9/2016
CN 106485772 A 3/2017
WO 2016191702 A1 12/2016

OTHER PUBLICATIONS

ISA/KR, "International Search Report and Written Opinion of the International Searching Authority," International Application No. PCT/KR2018/010037, dated Dec. 10, 2018, 9 pages.
(Continued)

*Primary Examiner* — Samuel D Fereja

(57) ABSTRACT

Systems and methods for identifying three dimensional (3D) content to stream. A method includes receiving information indicating a view field of a client device and identifying an amount of bandwidth available to stream the 3D content to the client device. The method includes assigning, for one or more of the objects, the bandwidth by, for each of the objects: determining whether the each object is within the view field of the client device based on a position of the each object; assigning a greater amount of the bandwidth to objects at least partially within the view field. The method includes streaming the 3D content to the client device according to the assigned bandwidth.

17 Claims, 15 Drawing Sheets

(51) Int. Cl.
*G06T 7/70* (2017.01)
*H04N 21/24* (2011.01)
*G06T 15/20* (2011.01)
*H04N 21/218* (2011.01)
*H04N 21/81* (2011.01)
*H04N 21/2343* (2011.01)

(52) U.S. Cl.
CPC ....... *H04N 21/816* (2013.01); *G06T 2200/16* (2013.01); *G06T 2207/10028* (2013.01); *G06T 2215/16* (2013.01)

(56) References Cited

U.S. PATENT DOCUMENTS

| | | | |
|---|---|---|---|
| 10,026,224 | B2 | 7/2018 | Bell et al. |
| 2013/0278732 | A1 | 10/2013 | Yeh |
| 2013/0321396 | A1 | 12/2013 | Kirk et al. |
| 2013/0321586 | A1 | 12/2013 | Kirk et al. |
| 2016/0198140 | A1 | 7/2016 | Nadler |
| 2016/0203646 | A1* | 7/2016 | Nadler ................ H04N 13/344 345/419 |
| 2016/0260196 | A1 | 9/2016 | Roimela et al. |
| 2017/0251208 | A1 | 8/2017 | Adsumilli et al. |
| 2017/0347100 | A1 | 11/2017 | Chou et al. |
| 2017/0347120 | A1 | 11/2017 | Chou et al. |
| 2017/0347122 | A1* | 11/2017 | Chou ................... H04N 19/36 |
| 2018/0160160 | A1* | 6/2018 | Swaminathan .... H04N 21/8456 |
| 2018/0270531 | A1* | 9/2018 | Ye ................... H04N 21/44218 |
| 2018/0308254 | A1* | 10/2018 | Fu ............................ G06T 7/80 |
| 2019/0310472 | A1* | 10/2019 | Schilt ................ H04N 21/2662 |

OTHER PUBLICATIONS

"View Frustum Culling", web.archive.org, www.Lighthouse3d.com, Apr. 30, 2011, 4 pages.
"Geometric Approach—Testing Boxes", web.archive.org, www.Lighthouse3d.com, May 4, 2011, 4 pages.
Gribb et al., "Fast Extraction of Viewing Frustum Planes from the World-View-Projection Matrix", Sep. 18, 2013, 11 pages.
Supplementary Partial European Search Report dated Jul. 2, 2020 in connection with European Patent Application No. 18 85 2191, 13 pages.
Supplementary European Search Report in connection with European Application No. 18852191.8 dated Sep. 18, 2020, 15 pages.
Elseberg et al., ISPRS Journal of Photogrammetry and Remote Sensing, vol. 76, "One billion points in the cloud—an octree for efficient processing of 3D laser scans," Feb. 1, 2013, 13 pages.
Kammerl et al., "Real-time Compression of Point Cloud Systems," IEEE International Conference on Robotics and Automation, St. Paul, Minnesota, May 14-18, 2012, 8 pages.
Zheng et al., "Optimized Neighbour Prefetch and Cache for Client-server Based Walkthrough," IEEE Computer Society, Proceedings of the 2003 International Conference on Cyberworlds, Piscataway, New Jersey, Dec. 3-5, 2003, 8 pages.
Picco, flipcode [online], <URL: https://www.flipcode.com/archives/Frustum_Culling.shtml>, "Frustum Culling," Apr. 1, 2003, 12 pages.
Office Action dated May 7, 2021 in connection with Chinese Patent Application No. 201880056434.X, 26 pages.
Peng et al., "Octree-Based Progressive Geometry Encoder", Proceedings of the SPIE, vol. 5242, Nov. 2003, pp. 301-311.
Chinese National Intellectual Property Administration, Decision to Grant dated Nov. 3, 2021 regarding Application No. CN201880056434.X, 7 pages.

* cited by examiner

METHOD AND APPARATUS OF POINT-CLOUD STREAMING

CROSS-REFERENCE TO RELATED APPLICATION AND CLAIM OF PRIORITY

This application claims priority under 35 U.S.C. § 119(e) to U.S. Provisional Patent Application No. 62/552,094 filed on Aug. 30, 2017, titled "METHOD AND APPARATUS OF POINT-CLOUD STREAMING." The above-identified provisional patent applications are hereby incorporated by reference in their entirety.

TECHNICAL FIELD

This disclosure relates generally to a view field-aware point cloud streaming. More specifically, this disclosure relates to determining whether objects and/or nodes are within the view field of the client device and assigning bitrates (bandwidths) across multiple objects including objects within the view field and objects outside the view field.

BACKGROUND

Virtual reality experiences are becoming prominent. For example, 360° video is emerging as a new way of experiencing immersive video due to the ready availability of powerful handheld devices such as smartphones. With the development of VR-related technology, users may view 360° content by using various devices. User's viewing 360° content such as videos and images feel more immersed compared to when they view a planar image. 360° video enables immersive "real life," "being there" experience for consumers by capturing the 360° view of the world.

SUMMARY

This disclosure provides a method and apparatus for a view field-aware point cloud streaming.

In a first embodiment, a server for identifying three dimensional (3D) content to stream is provided. The server includes a memory configured to store 3D point cloud data for a plurality of objects in the 3D content, a communication interface configured to receive, from a client device, information indicating a view field of a client device for the 3D content, and a processor configured to identify an amount of bandwidth available to stream the 3D content to the client device, and assign, for one or more of the objects, the available bandwidth to stream the 3D point cloud data, wherein to assign the available bandwidth, the processor is configured to, for each of the one or more of the objects: determine whether the each object is within the view field of the client device based on a position of the each object; assign a greater amount of the bandwidth to objects at least partially within the view field of the client device than objects not within the view field of the client device, wherein the communication interface is further configured to stream the 3D content to the client device according to the assigned bandwidths.

In a second embodiment, a method for identifying three dimensional (3D) content to stream is provided. The method includes storing 3D point cloud data for a plurality of objects in the 3D content, receiving, from a client device, information indicating a view field of a client device for the 3D content, identifying an amount of bandwidth available to stream the 3D content to the client device; assigning, for one or more of the objects, the bandwidth to stream the 3D point cloud data, wherein assigning the bandwidth comprises, for each of the one or more of the objects: determining whether the each object is within the view field of the client device based on a position of the each object; assigning a greater amount of the bandwidth to objects at least partially within the view field of the client device than objects not within the view field of the client device; and streaming the 3D content to the client device according to the assigned bandwidths.

In a third embodiment, a non-transitory computer-readable medium comprising program code for identifying three dimensional (3D) content to stream that, when executed by a processor, causes the processor to store 3D point cloud data for a plurality of objects in the 3D content, receive, from a client device, information indicating a view field of a client device for the 3D content via a communication interface, identify an amount of bandwidth available to stream the 3D content to the client device, assign, for one or more of the objects, the bandwidth to stream the 3D point cloud data, wherein assigning the bandwidth comprises, for each of the one or more of the objects: determine whether the each object is within the view field of the client device based on a position of the each object; assign a greater amount of the bandwidth to objects at least partially within the view field of the client device than objects not within the view field of the client device; and stream the 3D content to the client device according to the assigned bandwidths.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 16, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

1. System Overview

Figure 1:
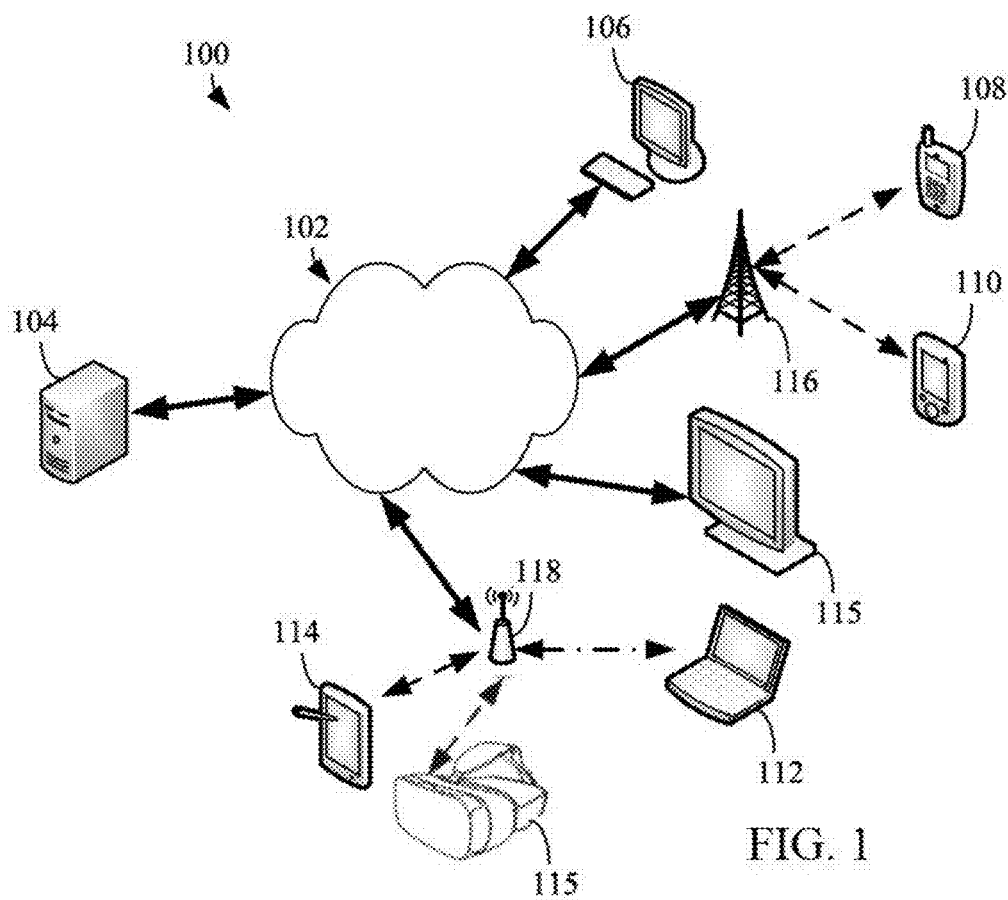
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-115. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, a tablet computer 114, and a head-mounted display (HMD). However, any other or additional client devices could be used in the computing system 100.

In this example, some client devices 108-115 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides a view field-aware point cloud streaming service. For example, server 104 may represent a video processor that determines whether objects/nodes of 3D content are within the view field of the client device and streams 3D content based on the determination. Smartphone 108 may represent a video player that plays the 3D content on for example, a head-up displayer in a virtual reality or augment reality mode.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
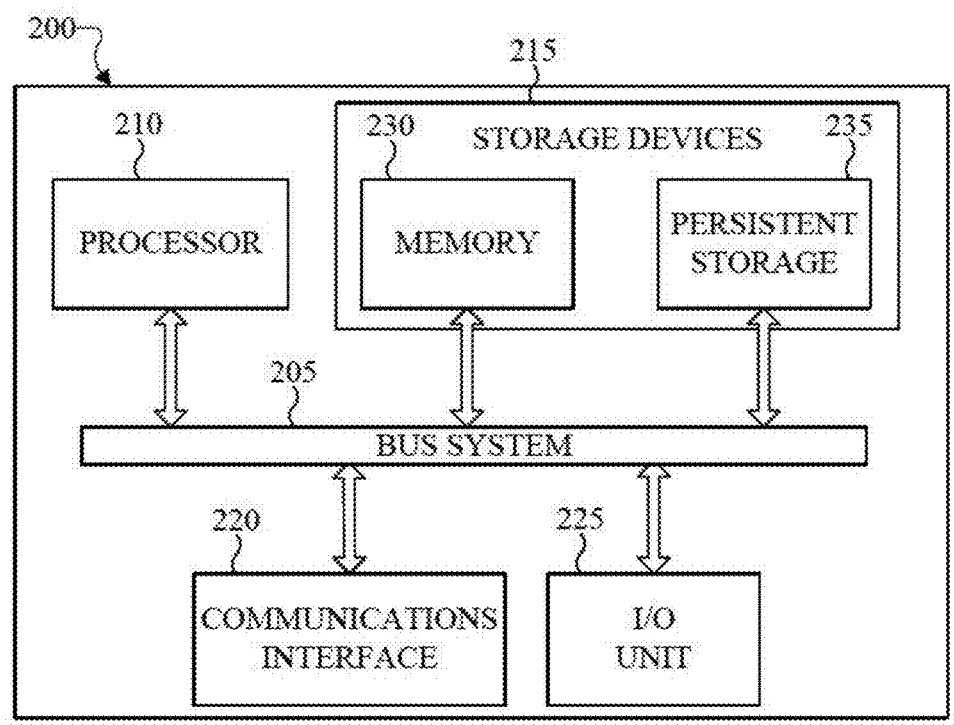
FIGS. 2 and 3 illustrate example devices in a computing system according to various embodiments of the present disclosure.
Figure 3:
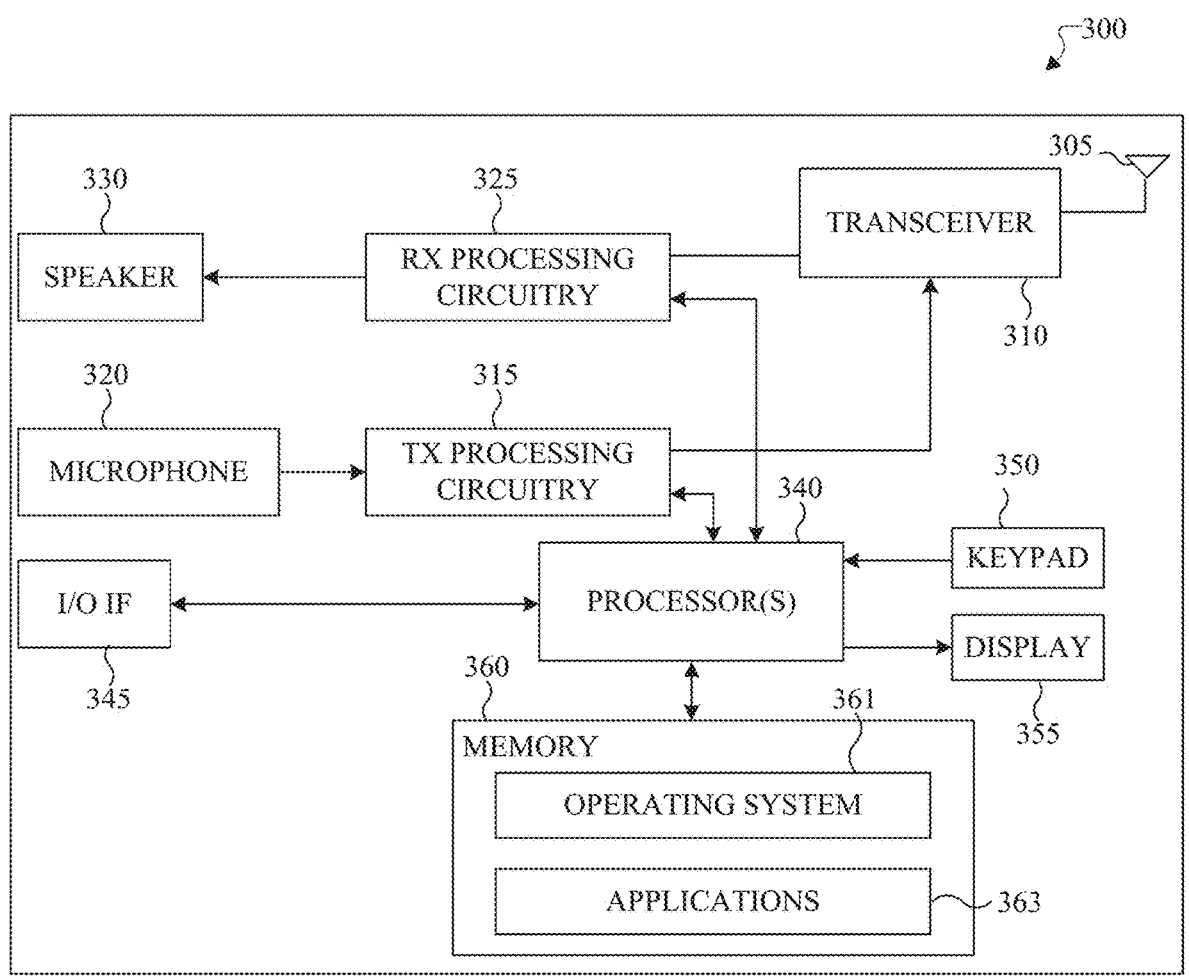

FIGS. 2 and 3 illustrate example devices in a computing system for view field-aware point cloud streaming service according to one embodiment of the present disclosure. In particular, FIG. 2 illustrates an example server 200, and FIG. 3 illustrates an example client device 300. The server 200 could represent the server 104 in FIG. 1, and the client device 300 could represent one or more of the client devices 106-115 in FIG. 1.

As shown in FIG. 2, the server 200 includes a bus system 205, which supports communication between one or more processors 210, at least one storage device 215, at least one communications interface 220, and at least one input/output (I/O) unit 225.

The processor(s) 210 execute instructions that may be loaded into a memory 230, such as instructions for performing a view field-aware point cloud streaming. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, the server 200 may implement an apparatus that provides a view field-aware point cloud streaming, as will be discussed in greater detail below. Note that while FIG. 2 is described as representing the server 104 of FIG. 1, the same or similar structure could be used in one or more of the client devices 106-115. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 receives a signal indicating a shape of a geometric frame and an area of interest in a planar frame. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Point clouds are 3D models that consist of hundreds of points. They are most commonly obtained as a result of scanning the real world through various scanning methods (e.g. laser scanning and photogrammetry). The point clouds are widely used in the applications for a series of tasks including generation of 3D maps (e.g. Google Maps, Cesium, etc.), capturing movement and poses (e.g. Kinect) and generating 3D assets for games as well as movies, etc.

Octree is a recursive data structure to represent 3D point cloud data. An octree structure of the 3D vertices can be easily formed by subdividing each 3D cell into eight at one time. In octree coding approach [1], one bit is used for each child cell to indicate whether this child cell is empty or not. Nonempty cells will be recursively subdivided until the finest resolution is reached, while empty cells will not be subdivided any more. After partitioning procedure, the server can have a multiple levels hierarchical structure (e.g., octree) and each level has a different node density/resolution.

Based on cell subdivision results, the encoding procedure is conducted by (1) obtaining bits associated with each child cell with corresponding codex (e.g. 1 indicates a nonempty child cell and 0 indicates an empty child cell); (2) getting the output bitstream for all subdivisions with a certain method (e.g. for each cell subdivision, output the bits for all child cells in the clockwise order starting from the left top child cell). In this way, a point cloud can be encoded with a strong advantage on space decomposition.

Streaming techniques have been developed continuously in the last few decades. We see rapid convergence of various multimedia services such as traditional TV, Internet Protocol TY(IPTV), video conferencing, live and mobile streaming services. At the same time, Internet has become a standard medium for multimedia delivery. The Hypertext Transfer Protocol (HTTP) on top of Transmission Control Protocol (TCP) has become the primary protocol for multimedia content delivery over the Internet. The streaming techniques of multimedia content such as videos have been greatly developed. However, the streaming of the point clouds is still a brand-new field for researchers to study and explore.

Figure 4:
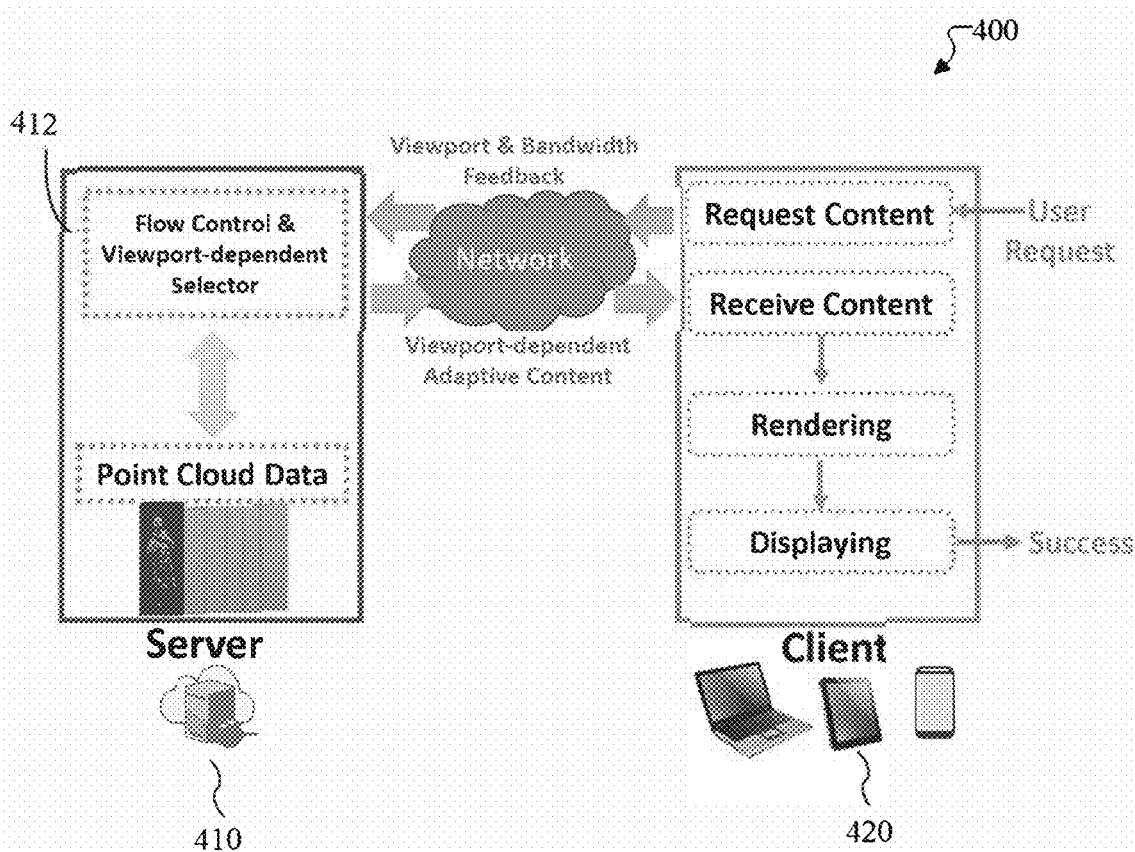
FIG. 4 illustrates an exemplary overview of a system 400 for a three-dimensional (3D) streaming service according to one embodiment of the present disclosure.

FIG. 4 illustrates an exemplary overview of a system 400 for a three-dimensional (3D) streaming service according to one embodiment of the present disclosure. The embodiment shown in FIG. 4 is for illustration only. Other embodiments are used without departing from the scope of the present disclosure.

The system 410 includes a server that stores 3D point cloud data and provides efficient point cloud streaming to various client devices, e.g., a laptop, pad, smartphone, head-mounted display (HMD), eyeglass-based display and the like.

The client device 420 may be equipped with one or more sensors to detect a movement, position or orientation of a user's body (e.g., a head or eyes). The sensors may include, for example, inertial, multi-axis gyroscopic, or acceleration sensors. The client device tracks a user's head movement to determine where the user is looking, which correspond to a view field. The view field may refer to a field that is visible in three dimensional environment through the client device. The view field can be determined based on a viewport and viewpoint.

After completing the streaming session initialization between the client device 420 and the server 410, the client device 420 sends a feedback which includes information on at least one of a viewport, view field and/or available streaming session bitrate (or bandwidth). In one embodiment, the feedback also includes channel state information (CSI), and the serve can determine an available bitrate or bandwidth based on the channel state information.

The server 410 then starts to send point cloud data through the procedure called flow control and view field-dependent selector 412. This procedure is designed to select the point cloud data (nodes in Octree) based on the view field and bandwidth/CSI feedback. It also offers a flow control of the stream to maintain an appropriate bandwidth. Next, the client device 420 receives view field-dependent adaptive content, render the content and display it on the client device's screen. Finally, this procedure repeats continuously to offer a good streaming service to the user.

2. View Field-Aware Point Cloud Streaming

Methods for determining whether hierarchical nodes are within a view field scope or not will be provided in this section. The methods can be done according to the virtual camera view field information and the bounding box of nodes in hierarchically structured point cloud. This enables the server to stream the regions within the view field, and regions that are outside of the view field will be reduced or be discarded. In the method for processing multiple objects, the determining procedure can be done according to the view field information of a camera and the multiple bounding box of nodes in multiple objects.

2.1. MPEG Media Transport Protocol (MMT) Signaling

The 6 DoF application-specific signaling message has an application identifier with the urn of value of "urn:mpeg:mmt:app:6dof:2017" or alternatively "urn:mpeg:mmt:app:6dof:2018."

The syntax of the ViewfieldFeedback is shown in the table below.

TABLE 1

ViewfieldFeedback and BandwidthFeedback

| Syntax | No. of bits | Mnemonic |
|---|---|---|
| Application ( ){ | | |
|     application_type | 16 | uimsbf |
|     if    (application_identifier( )== | | |
| "urn:mpeg:mmt:app:6dof:2017") { | 8 | uimsbf |
|         message_type | | |
|         if (message_type == 0x0001) { | 16 | uimsbf |
|             p11 | 16 | uimsbf |
|             p13 | 16 | uimsbf |
|             p22 | 16 | uimsbf |
|             p23 | 16 | uimsbf |
|             p33 | 16 | uimsbf |
|             p34 | 16*16 | uimsbf |
|             Model ViewMatrix | 16 | uimsbf |
|             BitrateValue | | |
|         } | | |
|     } | | |
| } | | |

The fields of the Table 1 are described in the following.

Application_type: This field defines application-type as an urn that uniquely identifies the application to consume the contents of this message. The length of this field is 16 bits.

message_type—This field defines message type as provided in Table 1. The length of this field is 8 bits.

p11, p13, p22, p23, p33, p34: This field defines the six elements in the 4×4 Projection Matrix and every element is in the ranges [−32768, 32767]. The length of this field is 16 bits and is scaled by 65536.

ModelViewMatrix: This field defines the 16 elements in the 4×4 ModelView Matrix and every element is in the ranges [−32768, 32767]. The length of this field is 16 bits and is scaled by 65536.

BitrateValue: This field defines the value of bitrate assigned to the current streaming session on the client side and is in the ranges [−32768, 32767]. The length of this field is 16 bits and is scaled by 65536.

Projection Matrix: In a perspective projection, a 3D point in a truncated pyramid frustum (eye coordinates) is mapped to a cube (NDC); the range of x-coordinate from [1, r] to [−1, 1], the y-coordinate from [b, t] to [−1, 1] and the z-coordinate from [n, f] to [−1, 1]. Projection Matrix can be obtained as follows, using OpenGL transform functions. In the disclosure, 6 non-contant elements are denoted using p11, p13, p22, p23, p33, p34. In one embodiment, one OpenGL projection matrix can be as follows:

$$\begin{pmatrix} \frac{2n}{r-i} & 0 & \frac{r+l}{r-l} & 0 \\ 0 & \frac{2n}{i-b} & \frac{i+b}{i-b} & 0 \\ 0 & 0 & \frac{-(f+n)}{f-n} & \frac{-2fn}{f-n} \\ 0 & 0 & -1 & 0 \end{pmatrix}$$

ModelView Matrix: The projection matrix can be obtained as follows using OpenGL transform functions. All 16 elements within the project matrix are denoted using ModelViewMatrix.

Table 2 and 3 below describe the 6DoF application specific signaling method using the MMT WebSockets.

TABLE 2

MMT WebSocket Sub-protocol Commands for point cloud streaming

| Command Code | Value | Description |
|---|---|---|
| Application | 7 | Application-specific command. The command may be registered by MPEG in Annex X. The application will be identified by a JSON encoded parameter, "application-type." |
| Message | 6 | Message-specific command. The command may be registered by MPEG in Annex X. The application will be identified by a JSON encoded parameter, "message-type." |

TABLE 3

The 6DoF application-specific JSON parameters

| JSON parameter | JSON format | Description |
|---|---|---|
| "application_type" | "application-type": "MPEG-6DoF-Feedback" | This field defines application-type as defined in Table 9-4. The length of this field is 16 bits. |
| "message_type" | "message-type": "6DoF- ViewfieldFeedback-Feedback" | This field defines message type as provided in Table 9-4. The length of this field is 8 bits. |
| "p11, p13, p22, p23, p33, p34" | {"p11": p11, "p13": p13, "p22": p22, "p23": p23, "p33": p33, "p34": p34} | This field defines the six elements in the 4x4 Projection Matrix and every element is in the ranges [−32768, 32767]. The length of this field is 16 bits and is scaled by 65536. |
| "ModelViewMatrix" | "ModelViewMatrix": {ModelViewMatrix} | This field defines the 16 elements in the 4x4 ModelView Matrix and every element is in the ranges [−32768, 32767]. The length of this field is 16 bits and is scaled by 65536. |
| "BitrateValue" | "BitrateValue": bitrate | This field defines the value of bitrate in kbps assigned to the current streaming session on the client side and is in the ranges [−32768, 32767]. The length of this field is 16 bits and is scaled by 65536. |

In the view field-aware streaming method, the determination of whether within a view field or not can be achieved in a node level instead of a object point level.

Figure 5:
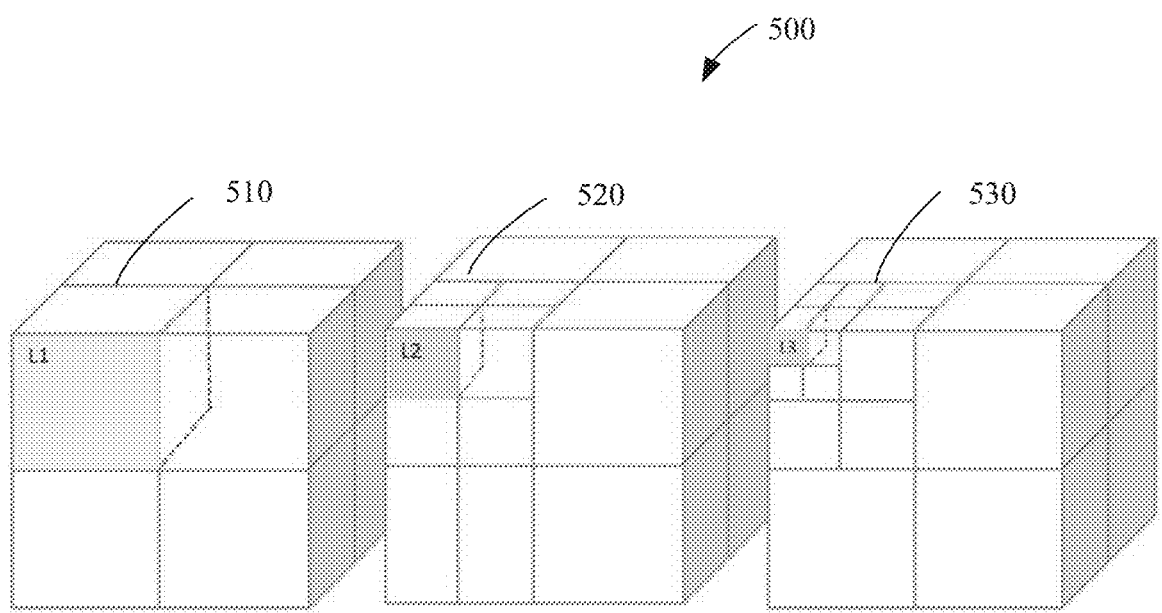
FIG. 5 illustrates exemplary multiple levels of the hierarchical structure of 3D point cloud according to embodiments of the present disclosure.

FIG. 5 illustrates exemplary multiple levels of the hierarchical structure 500 of 3D point cloud according to embodiments of the present disclosure. The embodiment of the hierarchical structure shown in FIG. 5 are for illustration only. Other embodiments are used without departing from the scope of the present disclosure.

As shown in FIG. 5, the nodes and their bounding boxes in the level 1 510, level 2 520 and level 3 530 are illustrated respectively. For each level, the size of a node shrinks while the point density increases. The hierarchical levels of nodes of an object may be created as follow: setting the object itself as a root node, and for each hierarchical level, dividing each level node into multiple sub-level nodes from the root node.

After partitioning procedure, the server can have a L levels hierarchical structure and each level has a different node density/resolution. In one embodiment, each point of original data set is assigned to exactly one octree node, leading to no new points or duplicates are created. In another embodiment, the point of original data set may be assigned to multiple octree nodes in different hierarchical levels. The points in the lower hierarchical level of node might be presented in the higher hierarchical level of node. Note that the determination of whether is within view field or not is processed on nodes level and/or object level instead of points level, which can greatly save computational cost and time consumption.

One algorithm for determining whether each object/node is within the view field region is as follows. The inputs of the algorithm are camera matrices including $M_{ModelView}$ and $M_{projection}$ as view field feedback, and positions of eight vertices $\{p_1, p_2, \ldots p_8\}$ of the bounding box of a given object/node, where $p_i=(x_i, y_i, z_i)$, i=1, 2, . . . 8. The output of the algorithm is the value of NodeInView equals to TRUE, representing a whole or partial object/node is within the view field; otherwise, NodeInView equals to FALSE, showing the object/node is out of the view field. Each object consists of multiple hierarchical levels of nodes from a root node to a maximum level of nodes. In one embodiment, the root node can be the object itself.

Three steps to implement this algorithm are as follows:

In step 1, the algorithm defines the function PointInView (x, y, z) returning '1' when the point (x,y,z) is within the view field, and otherwise returning '0' when the point (x,y,z) is out of the view field. In the following equations, $(x_{obj}, y_{obj}, z_{obj}, w_{obj})$ represents the object coordinates, $(x_e, y_e, z_e, w_e)$ denotes the eye coordinates, the $(x_{clip}, y_{clip}, z_{clip}, w_{clip})$ refers to the clip coordinates and $(x_{ndc}, y_{ndc}, z_{ndc})$ indicates the normalized device coordinates (NDC).

$$\begin{cases} (x_{obj}, y_{obj}, z_{obj}) = (x, y, z) \\ w_e = 1 \\ (x_e, y_e, z_e, w_e) = M_{ModelView} \cdot (x_{obj}, y_{obj}, z_{obj}, w_{obj}) \\ (x_{clip}, y_{clip}, z_{clip}, w_{clip}) = M_{projection} \cdot (x_e, y_e, z_e, w_e) \end{cases}$$

From the equations above, according to the inputs, the algorithm can obtain the value of the clip coordinates ($x_{clip}$, $y_{clip}$, $z_{clip}$). Based on it, the normalized device coordinates ($x_{ndc}$, $y_{ndc}$, $z_{ndc}$) can be calculated as follows.

$$\begin{cases} x_{ndc} = \frac{x_{clip}}{w_{clip}} \\ y_{ndc} = \frac{y_{clip}}{w_{clip}} \\ z_{ndc} = \frac{z_{clip}}{w_{clip}} \end{cases}$$

Then, PointInView (x, y, z) is obtained:

$$PointInView(x, y, z) = \begin{cases} 1, & \text{if } x_{ndc}, y_{ndc}, z_{ndc} \in [-1, 1] \\ 0, & \text{otherwise} \end{cases}$$

In step 2, the algorithm calculates the value of PointInView (x, y, z) for all eight vertices $\{p_1, p_2, \ldots p_8\}$ in the given object/node, where $p_i=(x_i, y_i, z_i)$, i=1, 2, 3 . . . 8;

In step 3, if any one of eight PointInView($x_i, y_i, z_i$), where i=1, 2, 3, . . . 8, equals to '1' (i.e., there exist at least one vertices within the view frustum), then the algorithm obtains NodeInView equals to TRUE, meaning the given object/node is within the view field; otherwise equals to FALSE, presenting the given object/node is out of the view field. The value of NodeInView can be calculated with the following equation:

$$NodeInView = \begin{cases} TRUE, & \text{if } \sum_{i=1}^{8} PointInView(x_i, y_i, z_i) \neq 0 \\ FALSE, & \text{if } \sum_{i=1}^{8} PointInView(x_i, y_i, z_i) = 0 \end{cases}$$

Figure 6:
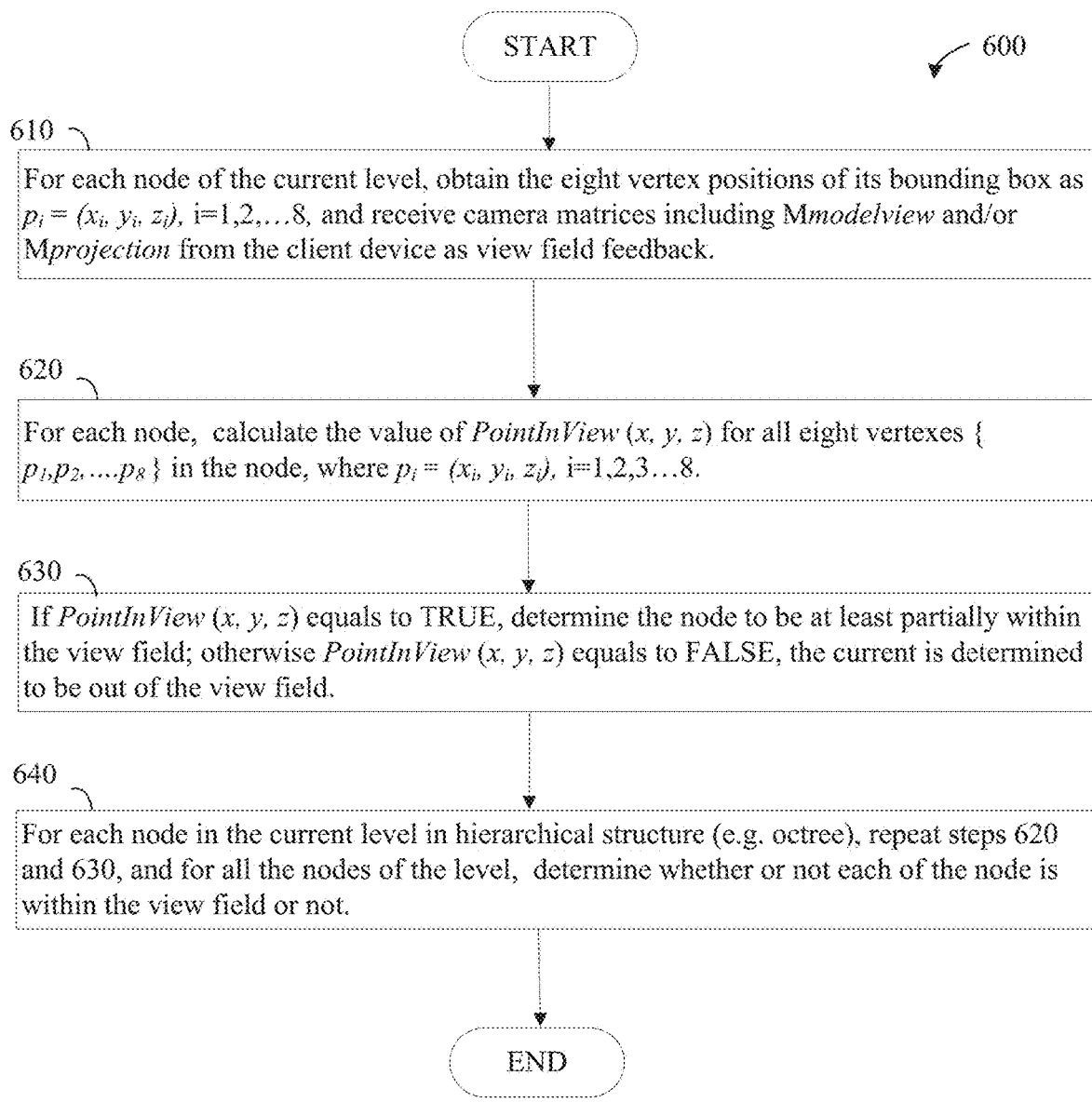
FIG. 6 illustrates an exemplary flow chart 600 of a method for determining whether each node is within the view field region, as may be performed by a server, according to one embodiment of the present disclosure.

FIG. 6 illustrates an exemplary flow chart 600 of a method for determining whether each node is within the view field region, as may be performed by a server, according to one embodiment of the present disclosure. The embodiment shown in FIG. 6 is for illustration only. Other embodiments are used without departing from the scope of the present disclosure. For example, while shown as a series of steps, various steps may overlap, occur in parallel, occur in a different order, occur multiple times, or not be performed in certain embodiments.

The method may begin at step 610 of the preparation of inputs. For each node of the current level, the method denotes the eight vertex positions of its bounding box as $p_i=(x_i, y_i, z_i)$, i=1, 2, . . . 8. Also, camera matrices including $M_{ModelView}$ and $M_{projection}$ are received from the client device as view field feedback.

In step 620, for each node, according to the function PointInView (x, y, z), calculate the value of PointInView (x, y, z) for all eight vertices $\{p_1, p_2 \ldots p_8\}$ in the given node, where $p_i=(x_i, y_i, z_i)$, i=1, 2, 3 . . . 8; Then, the value of NodeInView can be calculated.

In step 630, if NodeInView equals to TRUE, the method determines that the given node is within the view field (including two cases: totally within and partially within); otherwise equals to FALSE, the method determines that the given node is out of the view field.

In step 640, for each node in the current level in hierarchical structure (e.g. octree), repeat steps 620 and 630, and all the nodes of the level can be determined whether the nodes are within the view field or not. In one embodiment, only the nodes within the view field will be transmitted from the server to the client device. Note that this approach can deal with the scenarios where an object being partially within the view field exists. In such scenarios, the object being partially within the view field includes some nodes totally within the view field, some nodes partially within the view field, and also other nodes out of the view field. The sever will stream the nodes partially within the view field as the nodes will be determined to be within the view field (i.e., set the NodeInView of nodes partially within the view field as TRUE).

Since when determining whether a node is within the view field or not, the method uses the criterion for determination as the following: If any one of eight PointInView ($x_i$, $y_i$, $z_i$), where i=1, 2, 3, . . . 8, equals to 1, then NodeInView will equal to TRUE, meaning the given node is within the view field; otherwise equals to FALSE, indicating that the given node is out of the view field.

When the node is partially within the view field, then one or more of eight vertices need to exist within the view field, and thus it is concluded that this node is within the view field.

In a computer graphic rendering, occlusion often happens when users look towards the point cloud. Therefore, the visible points as points on the side facing the user's virtual camera and correspondingly define the invisible points as points on the other side, shielded by visible points in user's view.

Figure 7A:
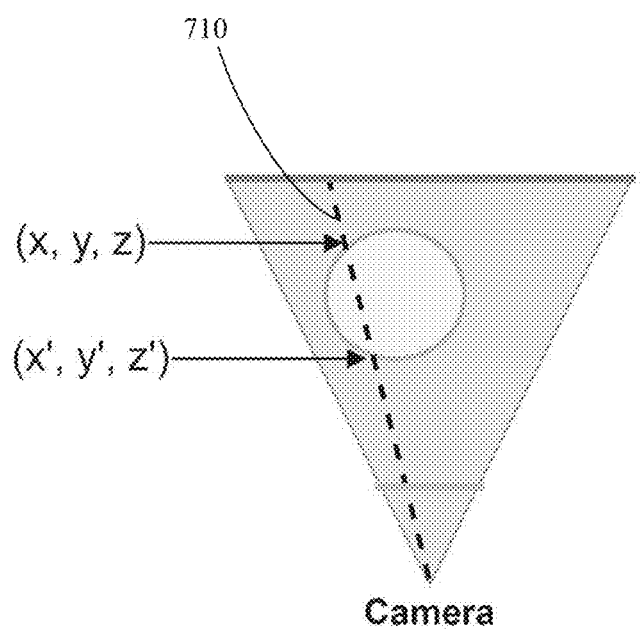
FIGS. 7A and 7B illustrate exemplary diagrams for demonstrating a method of determining a visible point according to embodiments of the present disclosure.
Figure 7B:
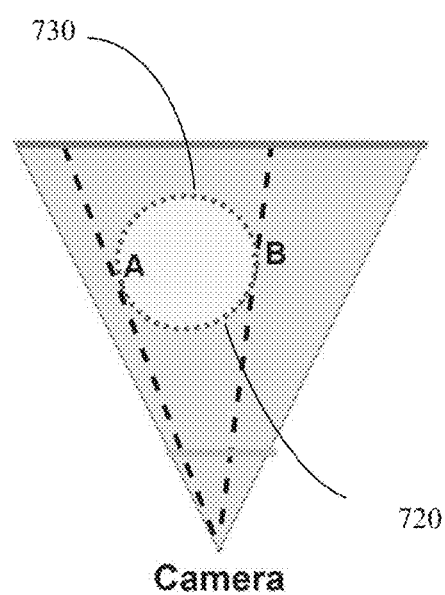

FIGS. 7A and 7B illustrate exemplary diagrams for demonstrating a method of determining a visible point according to embodiments of the present disclosure. Embodiments of the method shown in FIGS. 7A and 7B are for illustration only. Other embodiments are used without departing from the scope of the present disclosure.

In FIG. 7A, the points (x, y, z) and (x', y', z') lie on the same line 710 through the virtual camera position point, leading to the (x, y, z) as the invisible point and (x', y', z') as the visible point. Similarly, in FIG. 7B, the dot line 720 represents the visible part of the point cloud while the dot line 730 shows the invisible part of the point cloud.

One embodiment of determining which part of point cloud is within occlusion is described as follows. Here, the coordinate information (recorded in point cloud files) and the camera matrix are the input to determine the point index in the point cloud which is visible.

Firstly, every point in the point cloud has a unique point index and coordinate information. For each point coordinate information and camera matrix information, the method calculates its coordinates in the user's window space, called $(x,y,z)_{window}$.

Consequently, a lookup table is typically built with $(x,y)_{window}$ as keywords using $(x,y,z)_{window}$ for all points. During the process of building it, if the $(x,y)_{window}$ is new to the lookup table, the method saves its $z_{window}$ information and point index in the lookup table. Otherwise, if the $(x,y)_{window}$ has appeared, the method will compare the corresponding two $z_{window}$ (one is from the current point and the other is saved in lookup table) and then update the lookup table using the smaller $z_{window}$ (i.e. closer to the camera) and its point index.

Finally, the method can obtain a series of $z_{window}$ information and point indices in the lookup table. These point indices record all visible points' indices, and thus show the visible point determination results.

However, the above described method for determining whether or not the points are visible may be time consuming and inefficient process as it causes to check each point against the stored depth stored in the lookup table.

In another embodiment of one streaming method, the operation of determining which part of point cloud to be streamed may be processed at the server side. The client feedbacks the camera matrix to the server continuously or upon occurring of event that client view field changes become higher than a certain threshold.

One embodiment of calculating point's $(x,y,z)_{window}$ (i.e., coordinates in the user's window space), based on the camera matrix and $(x,y,z)_{object}$ (i.e., coordinates in the object space) is described as follows. The latter is recorded in the point cloud as the input.

Figure 8:
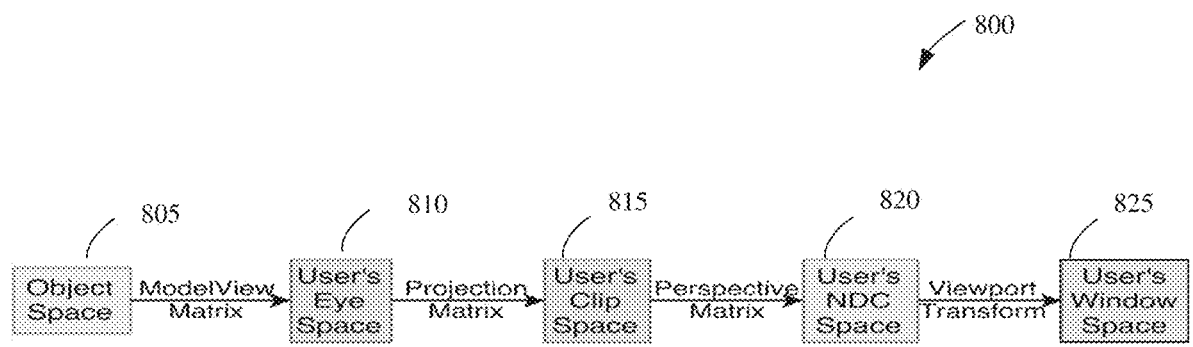
FIG. 8 illustrates an exemplary flow chart of a method for calculating point's $(x,y,z)_{window}$ according to one embodiments of the present disclosure.

FIG. 8 illustrates an exemplary flow chart 800 of a method for calculating point's $(x,y,z)_{window}$ according to one embodiments of the present disclosure. The embodiment shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

As shown in FIG. 8, the method transforms the object space 805 to the eye space 810 using a ModelView matrix $M_{ModelView}$. Then, the method uses a projection matrix $M_{projection}$ to transform the eye space 810 to the clip space 815. Subsequently, the clip space 815 is converted to the Normalized Device Coordinate (NDC) space 820 using perspective dividing $M_{Divide}$, and performs view field transform $M_{Viewport}$ to the window space 825. Mathematically, for point coordinate (x,y,z), the procedure of transformation from objection space 805 to the window space 825 can be denoted as follows:

$$(x,y,z)_{window} = M_{Viewport} \cdot M_{Divide} \cdot M_{Projection} \cdot M_{ModelView} \cdot (x,y,z)_{object}$$

Specifically, when the user changes virtual camera direction, only one of the camera matrix called projection matrix $M_{Projection}$ will change. It is a 4×4 matrix recording the camera position as well the camera's looking direction and these several camera matrix are easily obtained from the rendering machine in web browsers. In this way, the method can obtain the $(x,y,z)_{window}$ successfully from $(x,y,z)_{object}$.

Figure 9:
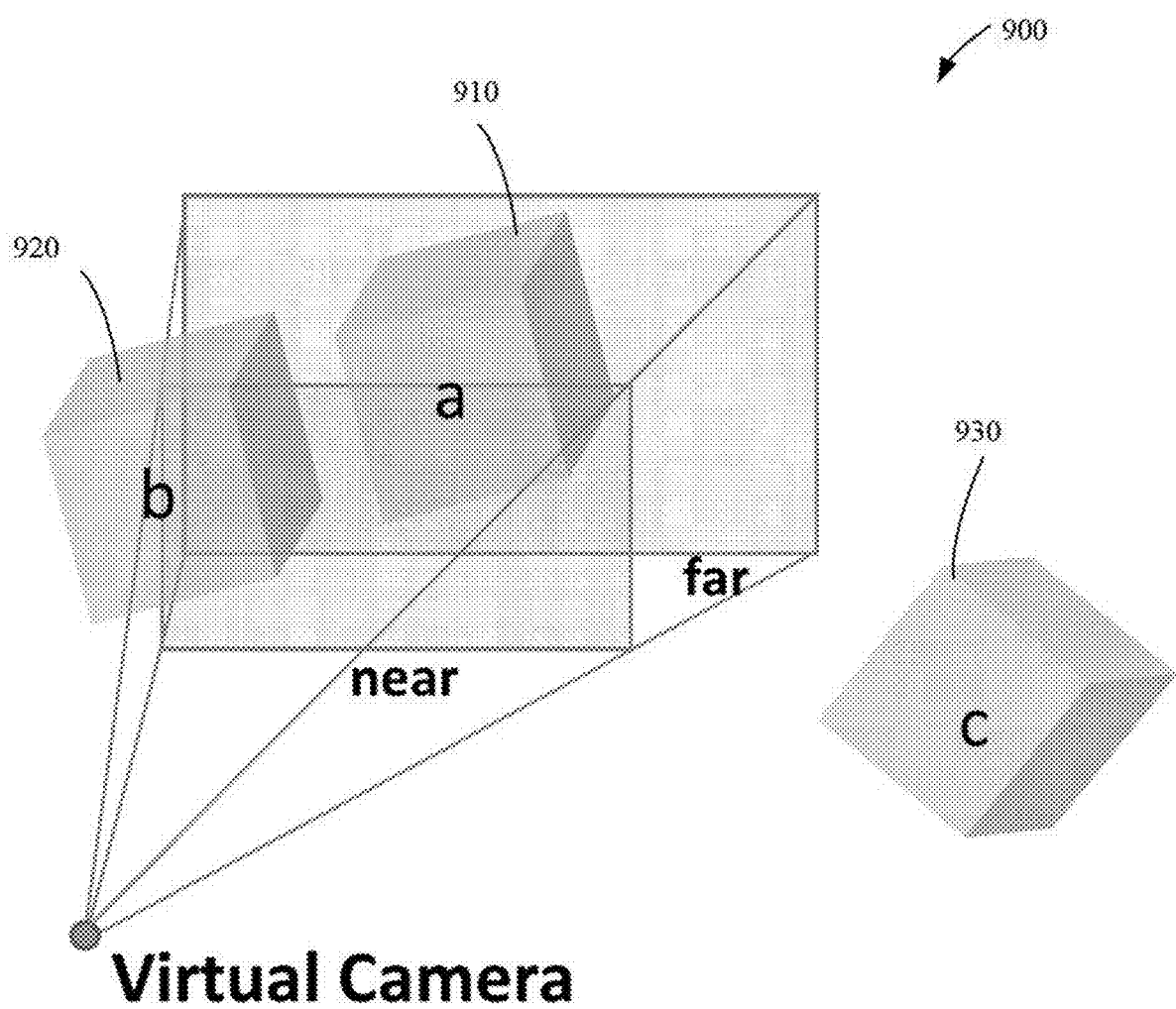
FIG. 9 illustrates an exemplary diagram for demonstrating how to determine whether hierarchical levels of nodes of multiple objects are within view field scope according to one embodiment of the present disclosure.

2.2 Multiple Objects—Determining Whether Hierarchical Nodes of Multiple Object are within View Field Scope FIG. 9 illustrates an exemplary diagram 900 for demonstrating how to determine whether hierarchical (e.g. Octree) levels of nodes of multiple objects are within view field scope according to one embodiment of the present disclosure. The embodiment shown in FIG. 9 is for illustration only. Other embodiments are used without departing from the scope of the present disclosure.

As shown in FIG. 9, the object 'a' 910 is rendered wholly within the view field, the object 'b' 920 is rendered partially within the view field, and the object 'c' 930 is rendered wholly out of the view field. Each point cloud object has a bounding box for its object, which includes all the points of the node in its space. Every bounding box has eight vertices.

When none of these eight vertices is rendered within the view field, then none of the points of the object will be rendered in the view field scope. This is a mathematical conclusion based on the topology of the cube. Each point cloud object contains large number of the points.

In one embodiment, the server can transmit only the regions which are rendered within or partially within the view field, and the other regions that are rendered outside of the view field can be discarded entirely. This will brings a lower bandwidth needed (i.e., less content to transmit) and a less latency (i.e., less time to transmit, render and display).

Figure 10:
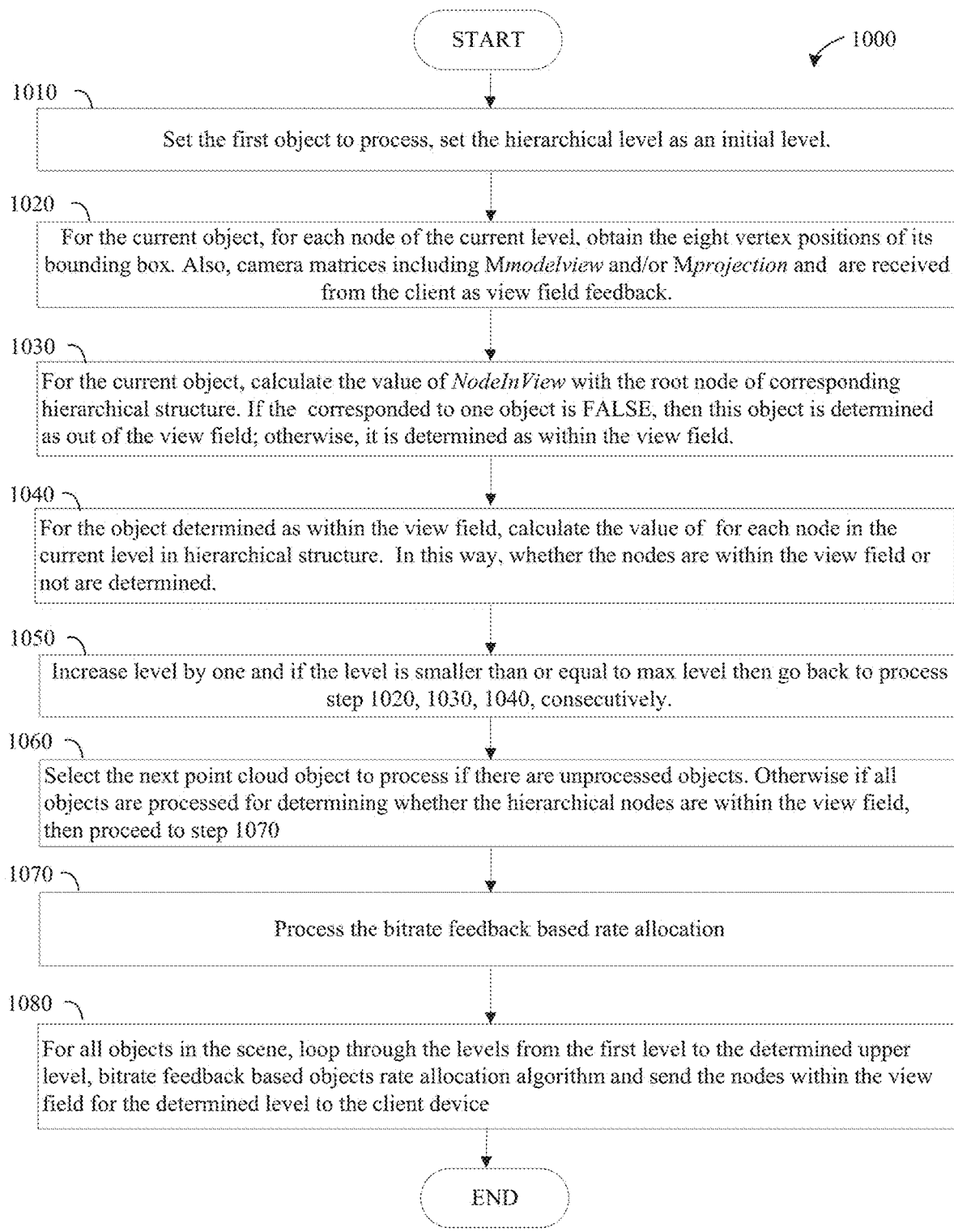
FIG. 10 is an exemplary flowchart for a method of view field-aware point cloud streaming for multiple objects according to one embodiment of the present disclosure.

FIG. 10 is an exemplary flowchart 1000 for a method of view field aware point cloud streaming for multiple objects according to one embodiment of the present disclosure. The flowchart 1000 shown in FIG. 10 is for illustration only. Other embodiments are used without departing from the scope of the present disclosure. For example, while shown as a series of steps, various steps may overlap, occur in parallel, occur in a different order, occur multiple times, or not be performed in certain embodiments.

The method begins at step 1010. In step 1010, the method sets a first object to process and sets the lowest level (i.e., the largest resolution level) of the hierarchical level as the first level.

In step 1020, for the current object, for each nodes of the given level, the eight vertex positions of its bounding box are denoted as $p_i=(x_i, y_i, z_i)$, i=1, 2, . . . 8. Also, camera matrices including $M_{ModelView}$ and $M_{projection}$ are received from the client as view field feedback as described previously.

In step 1030, for the current object, the value of NodeInView is calculated with each node of a corresponding hierarchical structure. In one embodiment, an initial node can be the root node of the corresponding hierarchical structure. If the NodeInView corresponded to each object is FALSE, then this object is determined as out of the view field; otherwise, it is determined as within the view field.

In step 1040, for each object determined as within the view field, the flowchart calculates the value of NodeInView for each node in the chosen level in hierarchical structure (e.g. octree).

In step 1050, the method increases the level by one, if the level is smaller than or equal to the maximum level and if an unassigned bandwidth exists, then go back to iterate the steps 1020, 1030 and 1040, consecutively. In one embodiment, this iteration process can be continued as long as the available bandwidth accommodates the increased hierarchical level of nodes. Otherwise, the method proceeds to step 1060.

In step 1060, the method selects the next point cloud object to process and goes back to step 1020 if there are unprocessed objects. Otherwise, if all objects are processed for determining whether the hierarchical nodes are within the view field, then the method proceeds to the next step 1060.

In step 1060, the method processes the bitrate feedback based rate allocation algorithm described in the below Section 3, titled "Bitrate Feedback Based Objects Rate Allocation."

In step 1070, for all objects in the scene, the server loop through the levels from the first level to the determined upper level determined in the Section 3, the bitrate feedback based objects rate allocation algorithm, and the server sends the nodes within the view field for the determined level to the client. In this way, whether the nodes are within the view field or not, the upper limit of the level of the hierarchical nodes are determined.

Figure 11:
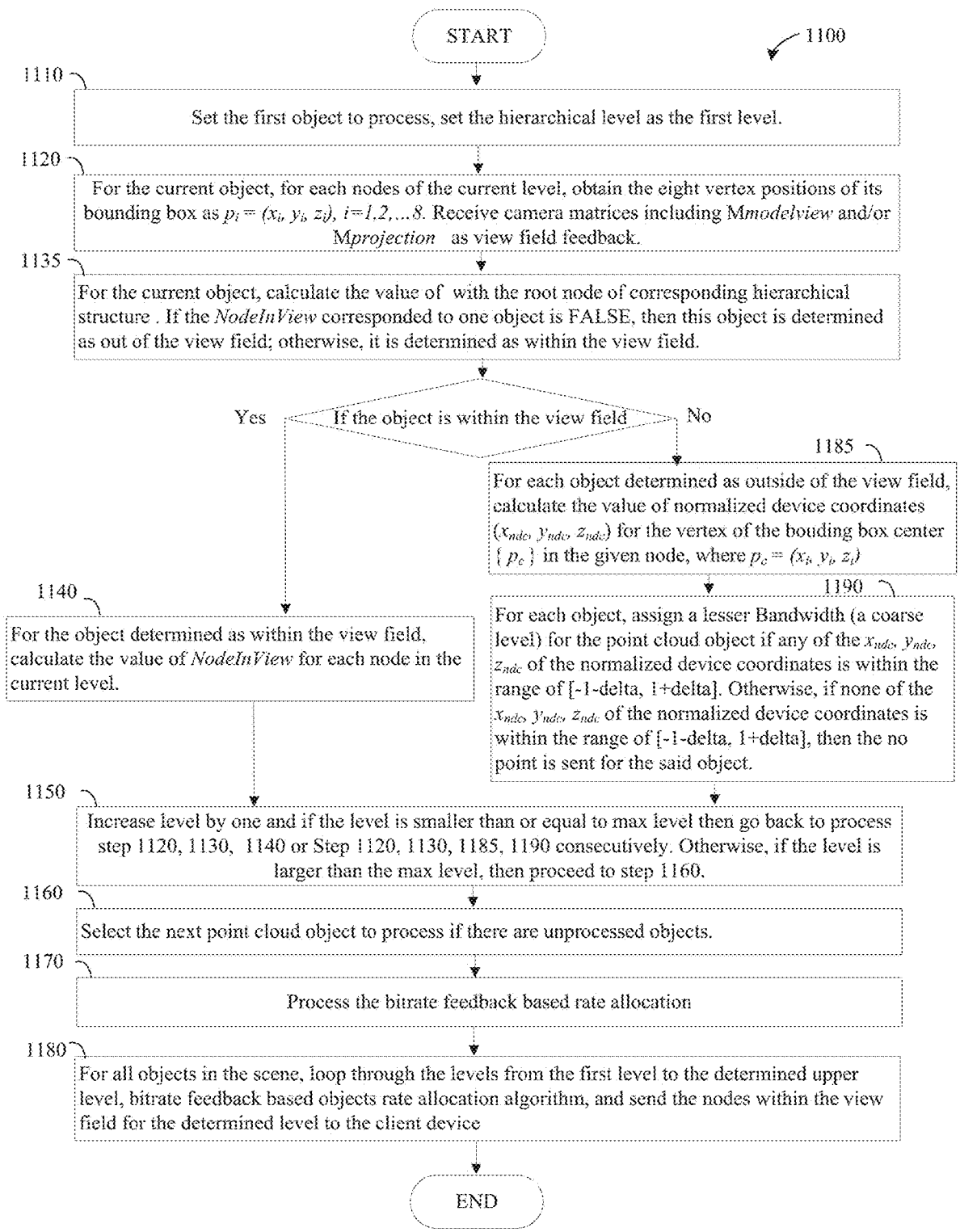
FIG. 11 illustrate another exemplary flowchart for a method of a view field-aware point cloud streaming according to one embodiment of the present disclosure.

FIG. 11 illustrates another exemplary flowchart 1100 for a method of a view field-aware point cloud streaming according to one embodiment of the present disclosure. The flowchart 1100 shown in FIG. 11 is for illustration only. Other embodiments are used without departing from the scope of the present disclosure. For example, while shown as a series of steps, various steps may overlap, occur in parallel, occur in a different order, occur multiple times, or not be performed in certain embodiments.

In this embodiment, the method is mostly similar to the flowchart 1000 except assigning a coarse level (a lower hierarchical level) for the objects outside of the view field. The steps 1110, 1120, 1130, 1140, 1150, 1160, 1170, and 1180 are same as the steps 1010, 1020, 1030, 1040, 1050, 1060, 1070 and 1080 shown in FIG. 10. The differences are that the flowchart 1100 has additional steps 1185 and 1190 for the objects outside of the view field.

In step 1185, for each of the objects determined to be outside of the view field, the method calculates the value of normalized device coordinates $(x_{ndc}, y_{ndc}, z_{ndc})$ for the vertex of the bounding box center $\{p_c\}$ in the given node, where $p_c=(x_i, y_i, z_i)$.

In step 1190, for each of the objects outside of the view field, the method assigns a coarse level, or a smaller bandwidth than bandwidths assigned to objects/nodes within the view field, for each of the point cloud object if any of the $x_{ndc}, y_{ndc}, z_{ndc}$ of the normalized device coordinates is within the range of [−1−delta, 1+delta]. The delta (or a threshold) is a variable that can be determined based on at least one of a buffering amount at a client device, a speed of the user's motion, a size of available bandwidth or so on. Otherwise, if none of the $x_{ndc}, y_{ndc}, z_{ndc}$ of the normalized device coordinates is within the range of [−1−delta, 1+delta], then the no point is sent for the said object. Alternatively, multiple deltas ranges are used to assign the different bandwidth levels according to the $x_{ndc}, y_{ndc}, x_{ndc}$ of the normalized device coordinates. The larger the value of the delta, The smaller bandwidths assigned to the objects within a period of the delta.

Figures 12A, 12B, 12C:
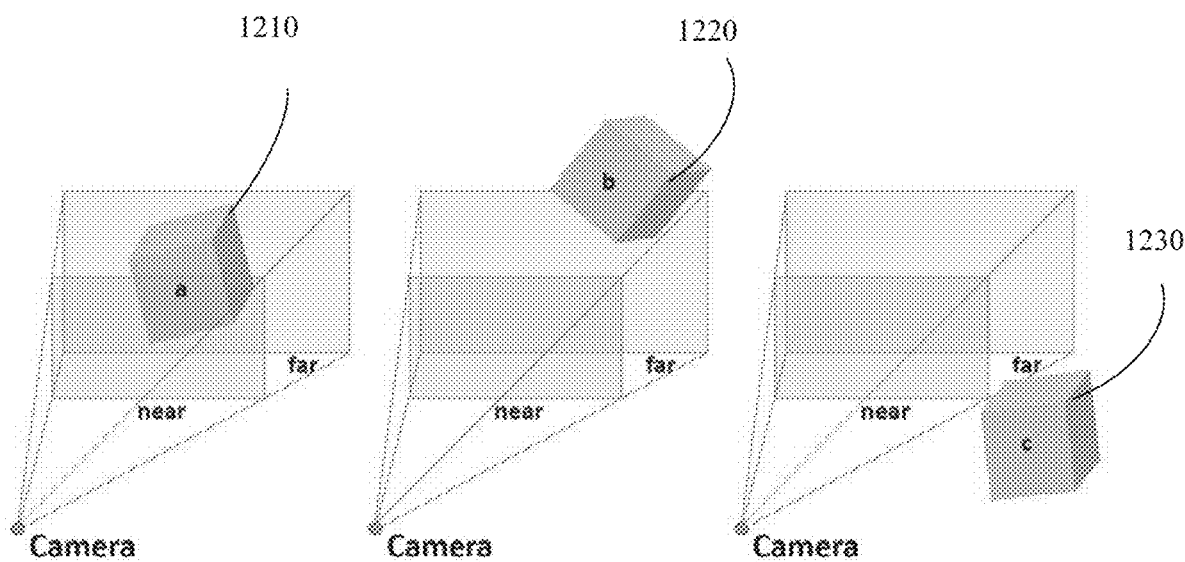
FIGS. 12A to 12C illustrate exemplary diagrams for demonstrating how to determine whether hierarchical nodes of a single object are within the view field scope according to one embodiment of the present disclosure.

2.3 Single Object—Determining Whether Hierarchical Nodes of Single Object Are Within View Field Scope FIGS. 12A to 12C illustrate exemplary diagrams for demonstrating how to determine whether hierarchical nodes of a single object are within view field scope according to one embodiment of the present disclosure. The embodiments shown in FIGS. 12A to 12C are for illustration only. Other embodiments are used without departing from the scope of the present disclosure.

FIG. 12A shows the object 'a' 1205 that is totally within the view frustum, FIG. 12B shows the object 'b' 1210 that is partially within the view frustum, and FIG. 12C shows the object 'c' 1215 that is totally out of the view frustum, In one embodiment, the server can transmit the regions within view frustum and regions that are outside of the view frustum can be discarded entirely. As a result, it will bring lower bandwidth needed (i.e. less content to transmit) and less latency (i.e. less time to transmit, render and display).

In a hierarchical structure, e.g. an octree structure, each node contains a lot of points and has its unique spatial distribution. Each node has a bounding box, which including all the points of the node in its space. Every bounding box has eight vertices. When none of these eight vertices is within the view frustum, then none of the points of these nodes will be in the view frustum. This is a mathematical conclusion based on the topology of the cube.

Figure 13:
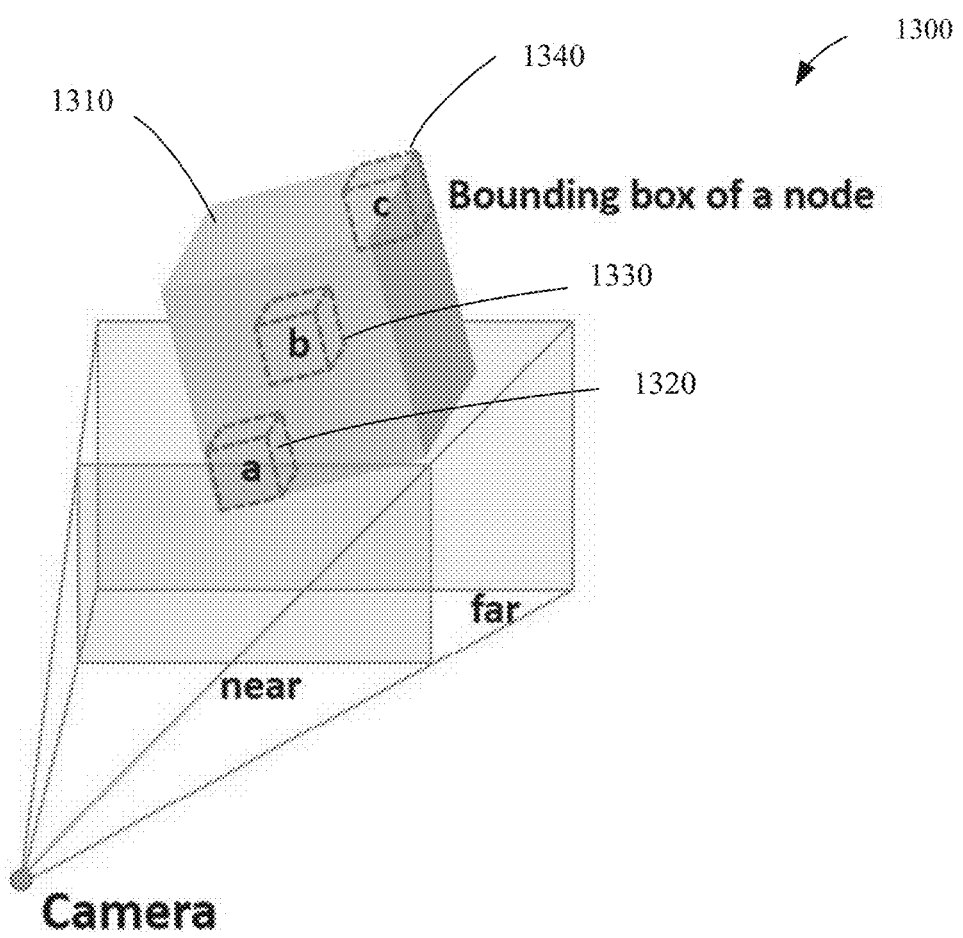
FIG. 13 illustrates an exemplary diagram 1300 for a point cloud object composed of multiple nodes according to one embodiment of the present disclosure.

FIG. 13 illustrates an exemplary diagram 1300 for a point cloud object composed of multiple nodes according to one embodiment of the present disclosure. The embodiment shown in FIG. 13 is for illustration only. Other embodiments are used without departing from the scope of the present disclosure.

As shown in FIG. 13, the object 1310 is partially within the view field. the object 1310 includes multiple nodes including the node 'a' 1320, the node 'b' 1330 and the node 'c' 1340. In the figure above, the three nodes 'a' 1320, 'b' 1330, 'c' 1340 represent different relationships between the bounding boxes of each node and the view field region, respectively. FIG. 13 shows the bounding box of the node 'a' 1320 is within a view field region while the node 'b' 1330 illustrates a bounding box of the node is rendered partially within the view field region. The whole bounding box of the node 'c' 1340 is out of the view region.

Figure 14:
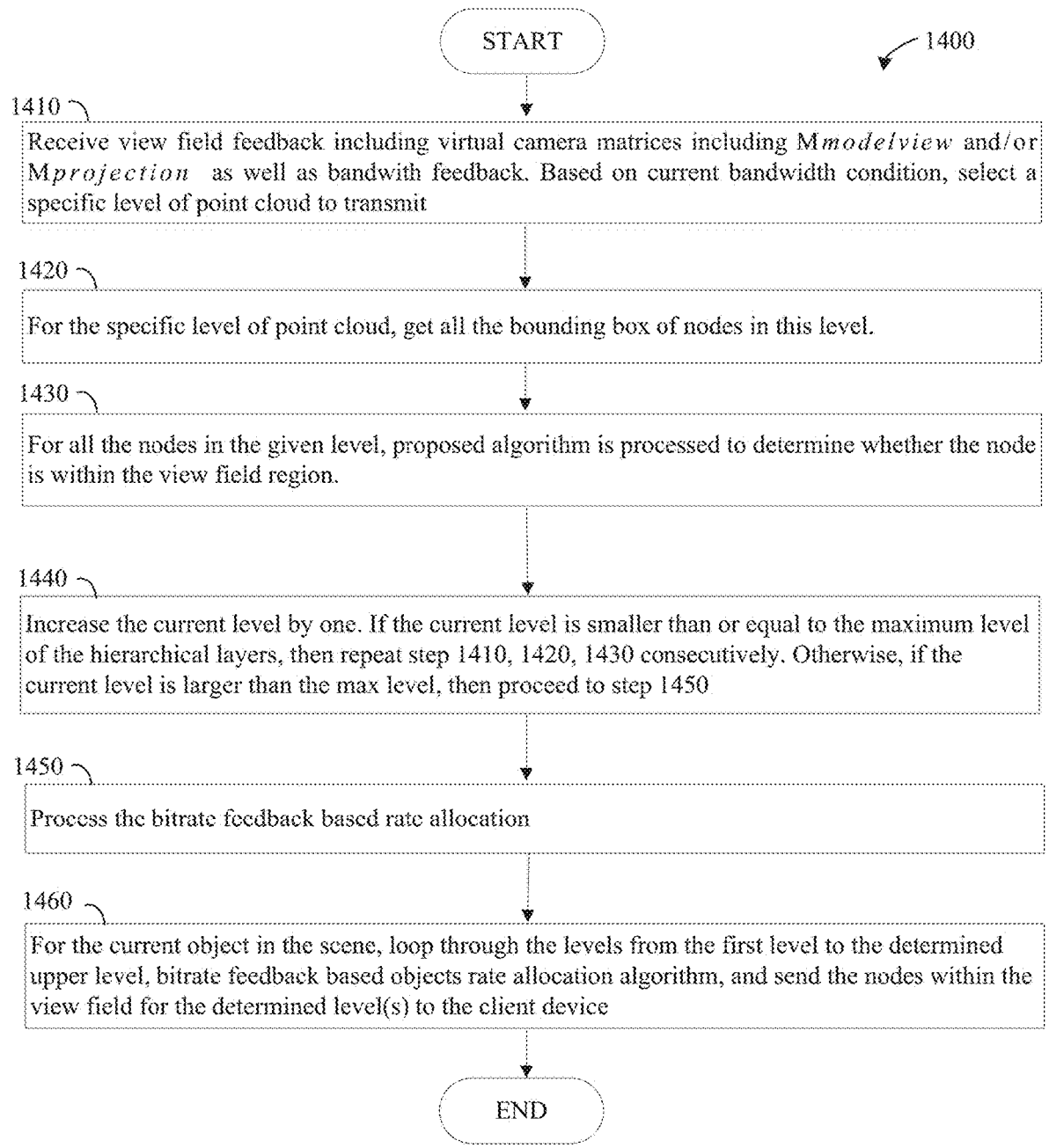
FIG. 14 illustrate an exemplary flowchart 1400 for a method of a view field-aware point cloud streaming according to one embodiment of the present disclosure.

FIG. 14 illustrates an exemplary flowchart 1400 for a method of a view field-aware point cloud streaming according to one embodiment of the present disclosure. The flowchart 1400 shown in FIG. 14 is for illustration only. Other embodiments are used without departing from the scope of the present disclosure. For example, while shown as a series of steps, various steps may overlap, occur in parallel, occur in a different order, occur multiple times, or not be performed in certain embodiments.

The method starts at step 1410. In step 1410, the server receives view field feedback including virtual camera matrices including $M_{ModelView}$ and $M_{projection}$ on as well as a bandwidth feedback a client device. Based on current bandwidth condition, the server selects a level of 3D object point cloud content to stream based on an available bandwidth determining whether an object or node is within the view field as described in the following section.

In step 1420, for the selected level of 3D object point cloud, the server obtains all the bounding box of nodes in the selected level.

In step 1430, for all the nodes in the current level, the server proceeds to determine whether the node is within the view field region.

In step 1440, the server increases the current level by one, if the current level is smaller than or equal to the maximum level of the hierarchical layers, and if an unassigned bandwidth exists, then go back to the steps 1410, 1420 and 1430, consecutively. Otherwise, if the current level is larger than the max level, then process the next operation.

In step 1450, it processes the bitrate feedback based rate allocation algorithm described in the Section 3.

In step 1460, for the current object in the scene, the server loop through the levels from the first level to the determined upper level determined in the Section 3 titled the bitrate feedback based objects rate allocation method, and the server sends the nodes within the view field for the processed level(s) to the client.

Figure 15:
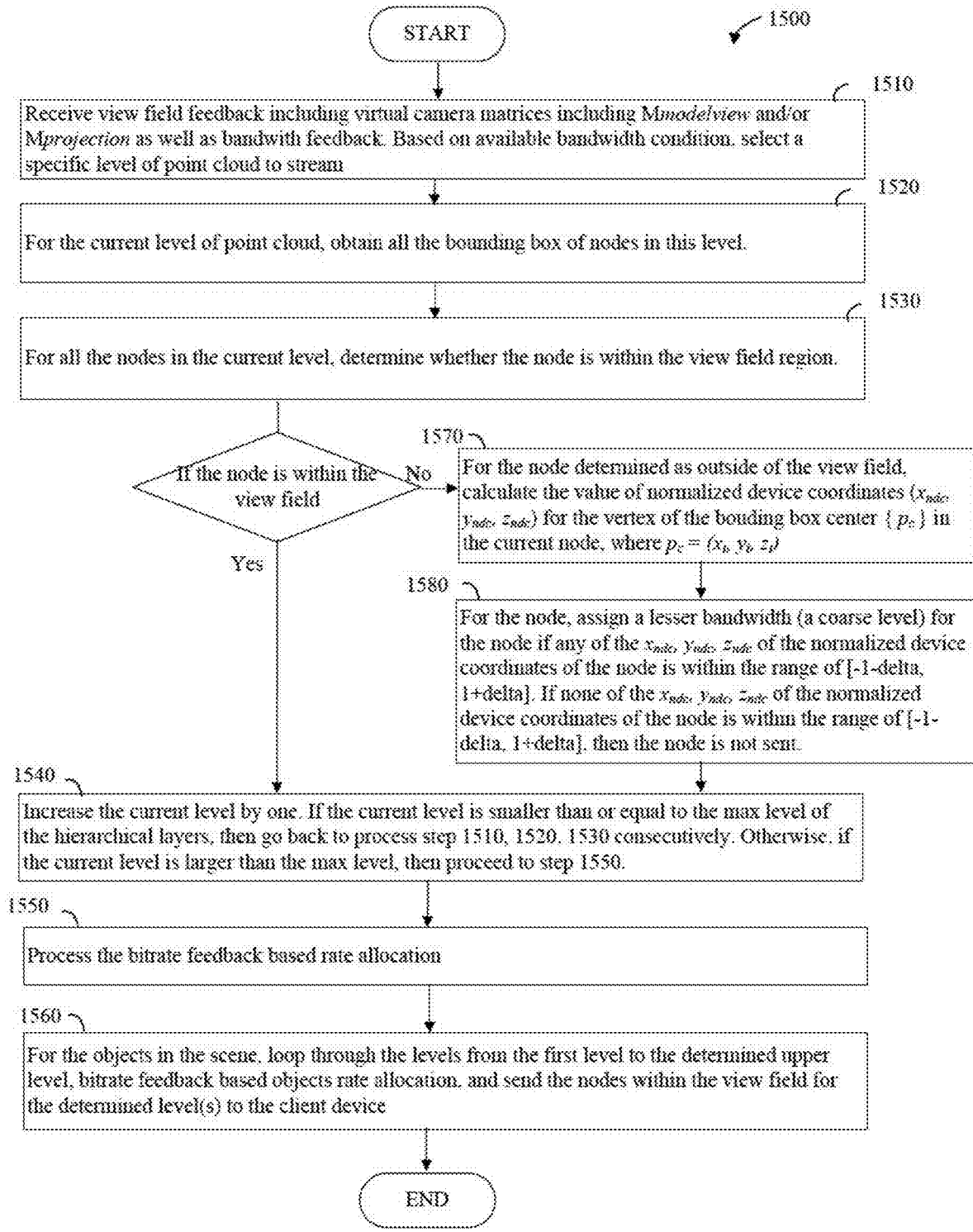
FIG. 15 illustrate another exemplary flowchart 1500 for a view field-aware point cloud streaming based on the feedback from a client device according to one embodiment of the present disclosure.

FIG. 15 illustrate another exemplary flowchart 1500 for a view field-aware point cloud streaming based on the feedback from a client device according to one embodiment of the present disclosure. The flowchart 1500 shown in FIG. 15 is for illustration only. Other embodiments are used without departing from the scope of the present disclosure. For example, while shown as a series of steps, various steps may overlap, occur in parallel, occur in a different order, occur multiple times, or not be performed in certain embodiments.

In this embodiment, the steps 1510, 1520, 1530, 1540, 1550, and 1560 are the same as the corresponding steps 1410, 1420, 1430, 1440, 1450 and 1460 of the flowchart 1400 shown in FIG. 14.

The differences are that if the node is outside of the view field, then in step 1570, the server calculates the value of normalized device coordinates $x_{ndc}, y_{ndc}, z_{ndc}$) for the vertex of the bounding box center $\{p_c\}$ in the given node, where $p_c=(x_i, y_i, z_i)$.

In step 1580, for nodes outside the view field, the server assigns a coarse level for the node of the point cloud object if any of the $x_{ndc}, y_{ndc}, z_{ndc}$ of the normalized device coordinates of the node is within the range of [−1−delta, 1+delta]. As described above, the delta is a variable that can be determined based on at least one of a buffering amount at a client device, a speed of the user's motion, or a size of available bandwidth, etc. Otherwise, if none of the $x_{ndc}, y_{ndc}, z_{ndc}$ of the normalized device coordinates of the node is within the range of [−1−delta, 1+delta], then the node is not sent. Then the steps 1540, 1550 and 1560 are processed consecutively.

3. Bitrate Feedback Based Objects Rate Allocation

In the following, a bitrate feedback method based on an objects rate allocation will be described, which comprises assigning bitrates (bandwidths) across multiple objects including objects within the view field and objects outside the view field.

Figure 16:
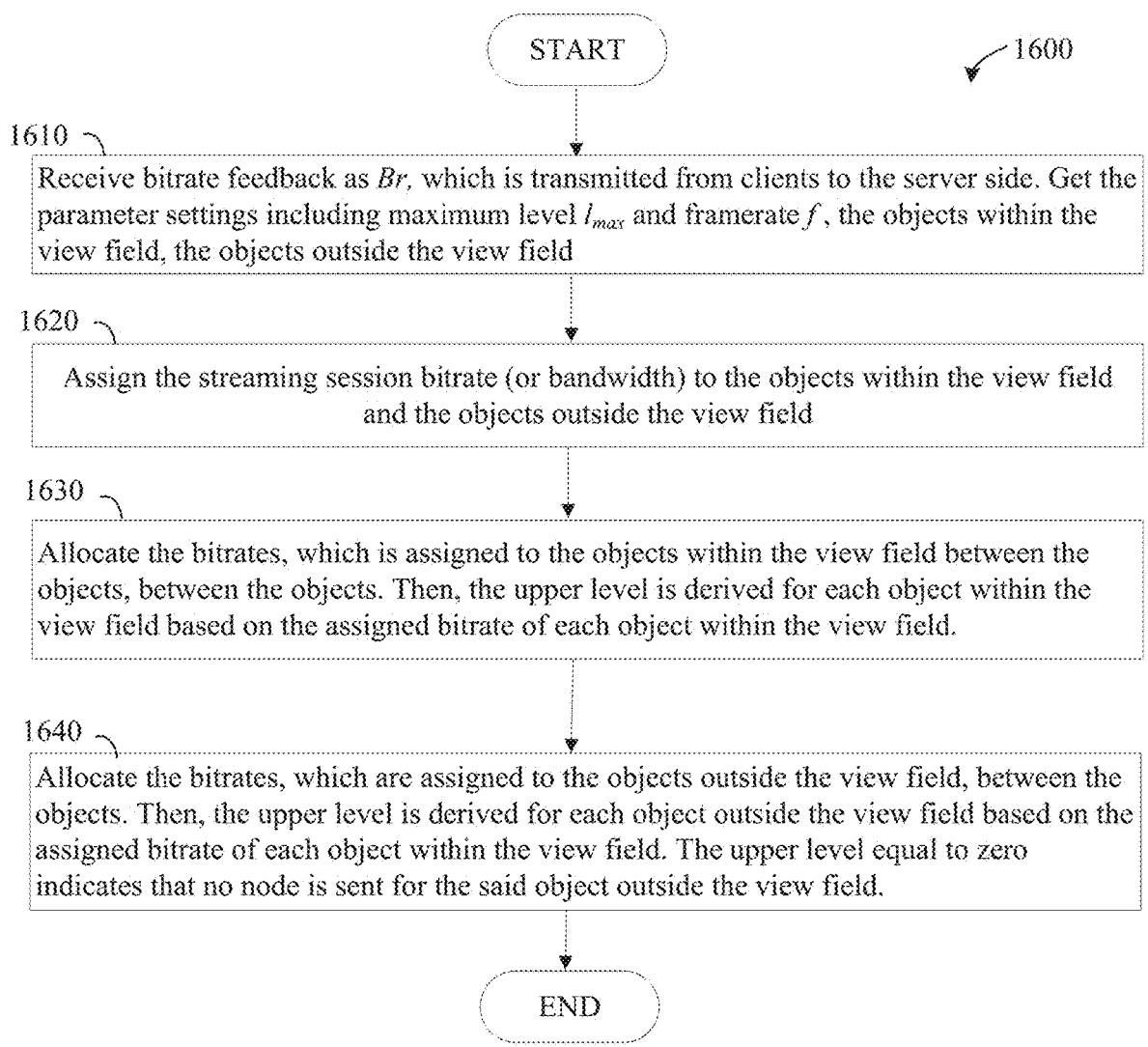
FIG. 16 illustrates an exemplary flowchart of a method for allocating bitrates (or bandwidths) to objects based on a bitrate feedback according to one embodiment of the present disclosure.

FIG. 16 illustrates an exemplary flowchart 1600 of a method for allocating bitrates (or bandwidths) to objects based on a bitrate feedback according to one embodiment of the present disclosure. The embodiment shown in FIG. 16 is for illustration only. Other embodiments are used without departing from the scope of the present disclosure. For example, while shown as a series of steps, various steps may overlap, occur in parallel, occur in a different order, occur multiple times, or not be performed in certain embodiments.

The method begins at step 1610. In step 1610, for the initialization, the server receives a bitrate feedback denoted as Br, which is transmitted from clients as described previously, and identifies the parameter settings including maximum level $l_{max}$ and framerate f, the objects within the view field, and the objects outside the view field.

In step 1620, the server assigns the streaming session bitrates to the objects within the view field and the objects outside the view field according to an assignment rule. In one embodiment, one assignment rule may assign bitrates with a certain ratio, for example, 70:30. In this example, the server can assign the 70% of the session bitrate (or bandwidth) to objects within the view field and assign the 30% of the session bitrate (or bandwidth) to objects outside the view field. The assignment ratio can be varied in other embodiments, such as 65:35, 75:25 and so on.

In step 1630, the server allocates the bitrates which are assigned to the objects within the view field, between the objects following an allocation rule for objects within the view field. In one embodiment, the allocation rule may uniformly allocate the assigned bitrate to each point cloud object within the view field. Alternatively, the allocation rule may allocate the assigned bitrate to the point cloud objects according the bitrate ratio of the current object and total bitrate of the all objects within the view field. Then, the upper level is derived for each object within the view field as following. The bit assigned to one frame of the object is derived by dividing the bitrate with the frame rate. Upon deriving the one frame's bits, the upper limit of the level is determined by accumulating the bits of the nodes of each layer until the bits accumulation reaches to the derived one frame's bits, wherein the bits accumulation is processed from the first layer to an upper layer. In such a way, the upper level is derived for each object within the view field.

In step 1640, the server allocates the bitrates, which is assigned to the objects outside the view field, between the objects according to an allocation rule for objects outside the view field. In one embodiment, the rule may uniformly allocate the assigned bitrate to each of point cloud objects outside the view field. Alternatively, the allocation rule may allocate the assigned bitrate to the point cloud objects according the bitrate ratio of the current object and total bitrate of the all objects outside the view field. Then, the upper level is derived for each object outside the view field based on the assigned bitrate of each object within the view field. Here, the upper level equal to zero indicates that no node is sent for the said object outside the view field. The process of setting the upper level for the object outside of the view field is described in the Section 2 above.

The above embodiments enable the server to only transmit the regions or denoted hierarchical nodes rendered within view field and hierarchical nodes that are rendered outside of the view field can be discarded entirely, or alternatively only sends the nodes within view field and transmit the nodes outside of the view field in a coarse manner, e.g. low level of nodes as a backup to deal with a sudden view field changes by the users. Also, the embodiments allow the system to significantly save a network bandwidth and improve the point cloud presentation quality.

The determination of whether is within a view field or not is processed on nodes level and/or point cloud object level instead of points level, which can greatly save computational cost and time consumption. In contrast, the traditional raytracing way of the determining whether or not the points are visible are time consuming and inefficient process as it causes to check each point against the stored depth stored in the lookup table.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A server, the server comprising:
a memory configured to store three-dimensional (3D) point cloud data for one or more objects within 3D content;
a communication interface configured to receive, from a client device, information indicating a view field of the client device in the 3D content; and
a processor configured to:
identify an amount of bandwidth available to stream the 3D content to the client device, and
identify a first object and a second object of the one or more objects,
when at least one vertex of the first object is within a range of the view field, determine that the first object is within the view field of the client device, as indicated by the information by comparing a position of the one or more objects within the 3D content to any portion of the one or more objects that are within the view field of the client device,
when no vertices of the second object are within the range of the view field, determine that the second object is out of the view field, and
assign a first amount of the bandwidth that is available to the first object and a second amount of the bandwidth that is available to the second object,
wherein the first amount of the bandwidth is greater than the second amount of the bandwidth, and
wherein the communication interface is further configured to stream the 3D content including the first object and the second object to the client device according to the assigned bandwidth.

2. The server of claim 1, wherein the information indicating the view field is at least one of a projection matrix or a model view matrix.

3. The server of claim 1, wherein:
the 3D point cloud data comprise the one or more objects, each of the one or more objects contain one or more hierarchical levels of nodes from a root node level to a maximum level, and
to create the one or more hierarchical levels of nodes, for the first object, of the one or more objects, the processor is configured to:
set the first object as the root node level, and
incrementally divide each level node into multiple sub-level nodes from the root node level.

4. The server of claim 3, wherein the processor is further configured to:
assign, for the one or more hierarchical levels of nodes, the bandwidth to stream the 3D point cloud data, wherein to assign the bandwidth for each of a given level of nodes, the given level of nodes starting from the root node level, the processor is configured to:
determine whether any nodes, within the given level, is within the view field of the client device based on a position of each node of the given level within the 3D content;
assign a greater amount of the bandwidth to a first subset of nodes of the given level that are within the view field of the client device than a second subset of nodes of the given level that are not within the view field of the client device; and
for the second subset of nodes that is out of the view field of the client device, the processor is configured to:
determine whether the one or more nodes, of the second subset of nodes, are within a threshold distance from the view field of the client device,
assign a lesser amount of the bandwidth to the one or more nodes that are within the threshold distance from the view field of the client device than the first subset of nodes that are within the view field of the client device, and
increase the given level by one level until the maximum level when an unassigned bandwidth exists.

5. The server of claim 4, wherein:
when a vertex of a first node is within the range of the view field, the processor is configured to determine that the first node is within the view field; and
when no vertex of the first node is within the range of the view field, the processor is configured to determine that the first node is out of the view field.

6. The server of claim 1, wherein:
the second object includes multiple objects; and
the processor is further configured to:
> determine whether at least one object of the second object, which are not within the view field of the client device, is within a threshold distance from the view field of the client device;
> assign a third amount of the bandwidth to each of the at least one object that is within the threshold distance from the view field of the client device; and
> assign the second amount of the bandwidth to any of the at least one object that is not within the threshold distance,
> wherein the third amount of the bandwidth is greater than the second amount of the bandwidth, and
> wherein the first amount of the bandwidth is greater than the third amount of the bandwidth.

7. A method, the method comprising:
storing three-dimensional (3D) point cloud data for one or more objects within 3D content;
receiving, from a client device, information indicating a view field of the client device in the 3D content;
identifying an amount of bandwidth available to stream the 3D content to the client device;
identifying a first object and a second object of the one or more objects;
when at least one vertex of the first object is within a range of the view field, determining that the first object is within the view field of the client device, as indicated by the information by comparing a position of the one or more objects within the 3D content to any portion of the one or more objects that are within the view field of the client device;
when no vertices of the second object are within the range of the view field, determining that the second object is out of the view field; and
assigning a first amount of the bandwidth that is available to the first object and a second amount of the bandwidth that is available to the second object, wherein the first amount of the bandwidth is greater than the second amount of the bandwidth; and
streaming the 3D content including the first object and the second object to the client device according to the assigned bandwidth.

8. The method of claim 7, wherein the information indicating the view field is at least one of a projection matrix or a model view matrix.

9. The method of claim 7, wherein:
the 3D point cloud data comprise the one or more objects, each of the one or more objects contain one or more hierarchical levels of nodes from a root node level to a maximum level, and
creating the hierarchical levels of nodes, for the first object of the one or more objects, the method comprises:
> setting the first object as the root node level, and
> incrementally dividing each level node into multiple sub-level nodes from the root node level.

10. The method of claim 9, the method further comprising:
assigning, for the one or more hierarchical levels of nodes, the bandwidth to stream the 3D point cloud data, wherein assigning the bandwidth for each of a given level of nodes, the given level of nodes starting from the root node level, comprises:
> determining whether any nodes, within the given level, is within the view field of the client device based on a position of each node of the given level within the 3D content;
> assigning a greater amount of the bandwidth to a first subset of nodes of the given level that are within the view field of the client device than a second subset of nodes of the given level that are not within the view field of the client device; and
> for the second subset of nodes that is out of the view field of the client device, the method comprises:
>> determining whether the one or more nodes, of the second subset of nodes, are within a threshold distance from the view field of the client device,
>> assigning a lesser amount of the bandwidth to the one or more nodes that are within the threshold distance from the view field of the client device than the first subset of nodes that are within the view field of the client device, and
>> increasing the given level by one level until the maximum level when an unassigned bandwidth exists.

11. The method of claim 10, the method further comprising:
when a vertex of a first node is within the range of the view field, determining that the first node is within the view field; and
when no vertex of the first node is within the range of the view field, determining that the first node is out of the view field.

12. The method of claim 7, wherein the second object includes multiple objects; and the method further comprises:
determining whether at least one object of the second object, which are not within the view field of the client device, is within a threshold distance from the view field of the client device;
assigning a third amount of the bandwidth to each of the at least one object that is within the threshold distance from the view field of the client device; and
assign the second amount of the bandwidth to any of the at least one object that is not within the threshold distance,
wherein the third amount of the bandwidth is greater than the second amount of the bandwidth, and
wherein the first amount of the bandwidth is greater than the third amount of the bandwidth.

13. A non-transitory computer-readable medium comprising program code, wherein the program code that, when executed by a processor, causes the processor to:
store three-dimensional (3D) point cloud data for one or more objects within 3D content;
receive, from a client device, information indicating a view field of the client device in the 3D content via a communication interface;
identify an amount of bandwidth available to stream the 3D content to the client device;
identify a first object and a second object of the one or more objects;
when at least one vertex of the first object is within a range of the view field, determine that the first object is within the view field of the client device, as indicated by the information by comparing a position of the one or more objects within the 3D content to any portion of the one or more objects that are within the view field of the client device;

when no vertices of the second object are within the range of the view field, determine that the second object is out of the view field, and assign a first amount of the bandwidth that is available to the first object and a second amount of the bandwidth that is available to the second object, wherein the first amount of the bandwidth is greater than the second amount of the bandwidth; and stream the 3D content including the first object and the second object to the client device according to the assigned bandwidth.

14. The non-transitory computer-readable medium of claim 13, wherein the information indicating the view field is at least one of a projection matrix or a model view matrix.

15. The non-transitory computer-readable medium of claim 13, wherein the 3D point cloud data comprise the one or more objects, each of the one or more objects contain one or more hierarchical levels of nodes from a root node level to a maximum level.

16. The non-transitory computer-readable medium of claim 15, wherein the program code that, when executed by the processor, further causes the processor to:

assign, for the one or more hierarchical levels of nodes, the bandwidth to stream the 3D point cloud data, wherein the program code for assigning the bandwidth for each of a given level of nodes, the given level of nodes starting from the root node level, comprises program code that, when executed by the processor, causes the processor to:

determine whether any nodes, within the given level, is within the view field of the client device based on a position of each node of the given level within the 3D content;

assign a greater amount of the bandwidth to a first subset of nodes of the given level that are within the view field of the client device than a second subset of nodes of the given level that are not within the view field of the client device; and wherein to assign the bandwidth for the second subset of nodes that is out of the view field of the client device comprises program code that, when executed by the processor, causes the processor to:

determine whether the one or more nodes, of the second subset of nodes, are is within a threshold distance from the view field of the client device, assign a lesser amount of the bandwidth to the one or more nodes that are within the threshold distance from the view field of the client device than the first subset of nodes that are within the view field of the client device, and increase the given level by one level until the maximum level when an unassigned bandwidth exists.

17. The non-transitory computer-readable medium of claim 13, wherein:

the second object includes multiple objects; and the program code that, when executed by the processor, further causes the processor to:

determine whether at least one object of the second object, which are not within the view field of the client device, is within a threshold distance from the view field of the client device;

assign a third amount of the bandwidth to each of the at least one object that is within the threshold distance from the view field of the client device; and assign the second amount of the bandwidth to any of the at least one object that is not within the threshold distance, wherein the third amount of the bandwidth is greater than the second amount of the bandwidth, and wherein the first amount of the bandwidth is greater than the third amount of the bandwidth.

* * * * *